(12) United States Patent
Banks (10) Patent No.: US 8,519,840 B1
(45) Date of Patent: Aug. 27, 2013

(54) VEHICLE U-TURN INDICATOR AND ASSOCIATED METHOD

(76) Inventor: Michael Banks, Encinitas, CA (US)

( * ) Notice: Subject to any disclaimer, the term of this patent is extended or adjusted under 35 U.S.C. 154(b) by 162 days.

(21) Appl. No.: 13/072,415

(22) Filed: Mar. 25, 2011

Related U.S. Application Data (60) Provisional application No. 61/317,297, filed on Mar. 25, 2010.

(51) Int. Cl.
*B60Q 1/34* (2006.01)

(52) U.S. Cl.
USPC .......................... 340/465; 340/468; 340/475

(58) Field of Classification Search
USPC .................................. 340/465, 468, 469, 475
See application file for complete search history.

(56) References Cited

U.S. PATENT DOCUMENTS

| | | | |
|---|---|---|---|
| 4,387,361 A * | 6/1983 | Reed | 340/475 |
| 4,868,541 A | 9/1989 | Sullivan | |
| 5,003,289 A | 3/1991 | Roman | |
| 5,663,708 A * | 9/1997 | Strawn | 340/465 |
| 5,680,100 A * | 10/1997 | Millsap | 340/463 |
| 5,731,755 A * | 3/1998 | Boxer | 340/465 |
| 6,958,687 B1 * | 10/2005 | Smith | 340/468 |
| 6,970,074 B2 * | 11/2005 | Perlman | 340/426.1 |
| 7,218,212 B2 * | 5/2007 | Hu | 340/465 |
| 7,417,534 B2 * | 8/2008 | Quach et al. | 340/468 |
| 2003/0006908 A1 * | 1/2003 | Wilson | 340/901 |
| 2007/0069881 A1 * | 3/2007 | Dohan | 340/465 |

* cited by examiner

*Primary Examiner* — Eric M Blount (57) ABSTRACT

A vehicle U-turn signal indicating system for identifying abrupt vehicle preferably includes a plurality of U-turn signal lights adapted to positioned on an exterior surface of a vehicle, a steering wheel having a U-turn signal activator pivotally coupled thereto, and an electronic switch relay electrically coupled to the U-turn signal activator and the U-turn signal lights. Advantageously, the U-turn signal activator is selectively displaced between first and second positions in such a manner that the electronic switch relay selectively toggles the U-turn signal lights between illuminated and non-illuminated modes respectively.

10 Claims, 8 Drawing Sheets

VEHICLE U-TURN INDICATOR AND ASSOCIATED METHOD

CROSS REFERENCE TO RELATED APPLICATIONS

This application claims the benefit of U.S. Provisional Application No. 61/317,297, filed Mar. 25, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle signal indicators and, more particularly, to a vehicle U-turn indicator for providing users with an easy and convenient means of informing motorists of the users' intent to make a U-turn.

2. Prior Art

Every day, thousands of consumers across the country are involved in automobile accidents. Ranging in degree from the mild "fender benders" where those involved walk away unscathed, to serious pileups where one or more persons ends up permanently disabled or in worse case scenarios, loses their life, an automobile accident can be a traumatic, life-altering experience. Automobile accidents are so prevalent in this country, that according to the National Safety Council and the United States National Highway Traffic Safety Administration, there are approximately 11.2 million motor vehicle accidents in the United States yearly. Of this total, 5.9 million resulted in injuries while 36,223 were fatal motor vehicle accidents, resulting in 40,676 deaths. Total economic loss was $110.5 billion which also is a determinate factor in rising insurance costs. The highest number of automobile accident fatalities was directly related to the 80 years of age and over segment, followed by the 16 to 20 years of age segment. These two age groups accounted for over one half of all motor vehicle accident fatalities.

With the increased concern for motorist safety and rising insurance costs, it is not surprising that safety equipment is a leading research and development concern for automotive manufacturers. Though drivers put their life at risk each time they operate a vehicle it is the industries' resolution to make the operation of their vehicles as safe as possible. Various safety devices that have been implemented include advanced seat belt mechanisms, air bags and stronger structural designs.

The automotive industry subjects their vehicles to strenuous crash tests to validate their safety features' effectiveness. Also, features are incorporated to provide operators of vehicles adequate measures to avert the possibility of accidents. Lighting, for example, is a major factor in preventative safety measures. Halogen headlamps, turn signals on the front, back and side of vehicles, tail lights, reverse lights and brake lights contribute to preventing accidents by allowing other drivers to see and predetermine which way a driver intends to maneuver his vehicle.

When it comes to driving, turn signals may be one of the most underutilized devices on a car. Yet, signaling is one of the most important actions one can take as a driver, by warning other drivers of an impending move to minimize hazardous surprises. Failing to signal is the cause of numerous accidents and is also a significant contributing factor to several cases of 'road rage'. The act of making a U-turn can be even more dangerous then making a standard turn. It is sometimes necessary when making this maneuver to come to an almost complete stop, increasing the chances that a car following too closely behind will rear-end one's vehicle. Unfortunately even using a turn signal in these situations may not be sufficient to avert a possible accident.

Accordingly, a need remains for an system in order to overcome the above-noted shortcomings. The present invention satisfies such a need by providing a vehicle U-turn indicator that is convenient and easy to use, lightweight yet durable in design, versatile in its applications, and designed for informing motorists of the users' intent to make a U-turn.

BRIEF SUMMARY OF THE INVENTION

In view of the foregoing background, it is therefore an object of the present invention to provide a vehicle U-turn signal indicating system for identifying abrupt vehicle maneuvers. These and other objects, features, and advantages of the invention are provided by a vehicle U-turn signal indicating system preferably including a plurality of U-turn signal lights adapted to positioned on an exterior surface of a vehicle, a steering wheel having a U-turn signal activator pivotally coupled thereto, and an electronic switch relay electrically coupled to the U-turn signal activator and the U-turn signal lights. Advantageously, the U-turn signal activator is selectively displaced between first and second positions in such a manner that the electronic switch relay selectively toggles the U-turn signal lights between illuminated and non-illuminated modes respectively.

In a non-limiting exemplary embodiment, the U-turn signal activator may include a plurality of brackets located within the steering wheel, and a lever having a first end pivotally coupled to a first one of the brackets and further having a second end passing through second and third ones of the brackets. Such a lever may have a slot intermediately located between the first and second ends thereof. A linear arm may have a finger slidably coupled to the slot, and a plurality of conductive terminals interchangeably engaged to axially opposed ends of the linear arm. Such conductive terminals may be electrically coupled to the electronic switch relay such that one of the U-turn signal lights is illuminated when a corresponding one of the conductive terminals engages the linear arm.

In a non-limiting exemplary embodiment, the finger linearly reciprocates within the slot as the lever is pivoted along the arcuate path and thereby causes the linear arm to linearly reciprocate along a bi-directional linear path defined through the second and third brackets.

In a non-limiting exemplary embodiment, the linear arm may be provided with first and second groups of protrusions extending outwardly from the opposed ends thereof respectively. Such protrusions frictionally pass through the second and third brackets as the linear arm reciprocates along the bi-directional linear path.

In a non-limiting exemplary embodiment, an instrument panel indicator may bear at least one of the U-turn signal lights.

In a non-limiting exemplary embodiment, each of the U-turn signal lights may include a lens coupled thereto. Notably, such a lens preferably has surface indicia illustrating an image of a U-turn.

The present disclosure may further include a method of utilizing a vehicle U-turn signal indicating system for identifying abrupt vehicle maneuvers. Such a method preferably includes the steps of: providing a plurality of U-turn signal lights adapted to be positioned on an exterior surface of a vehicle; providing a steering wheel having a U-turn signal activator pivotally coupled thereto; providing and electrically coupling an electronic switch relay to the U-turn signal activator and the U-turn signal lights respectively; and selectively displacing the U-turn signal activator between first and second positions in such a manner that the electronic switch relay selectively toggles the U-turn signal lights between illuminated and non-illuminated modes respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The system of this invention is referred to FIGS. 1-8 and is intended to provide a vehicle U-turn indicator. It should be understood that the present invention may be used to inform motorists of a user's intent to make a U-turn with many types of vehicles, and should not be limited to any particular type of vehicle described herein.

Referring to FIGS. 1-8, the vehicle U-turn indicator 10 may include a plurality of U-turn signal lights 20, an electronic switch relay 21, a U-turn signal activator 22, and an instrument panel indicator 23. The electronic switch relay 21 may be communicatively linked to the signal activator 22, U-turn signal lights 20 and the instrument panel indicator 23. The electrical circuitry of the system 10 may further be connected to an existing battery power supply 11 of the vehicle 12. The U-turn signal lights 20 may include at least four lights; two each for a left and right handed U-turn, respectively.

Figure 1:
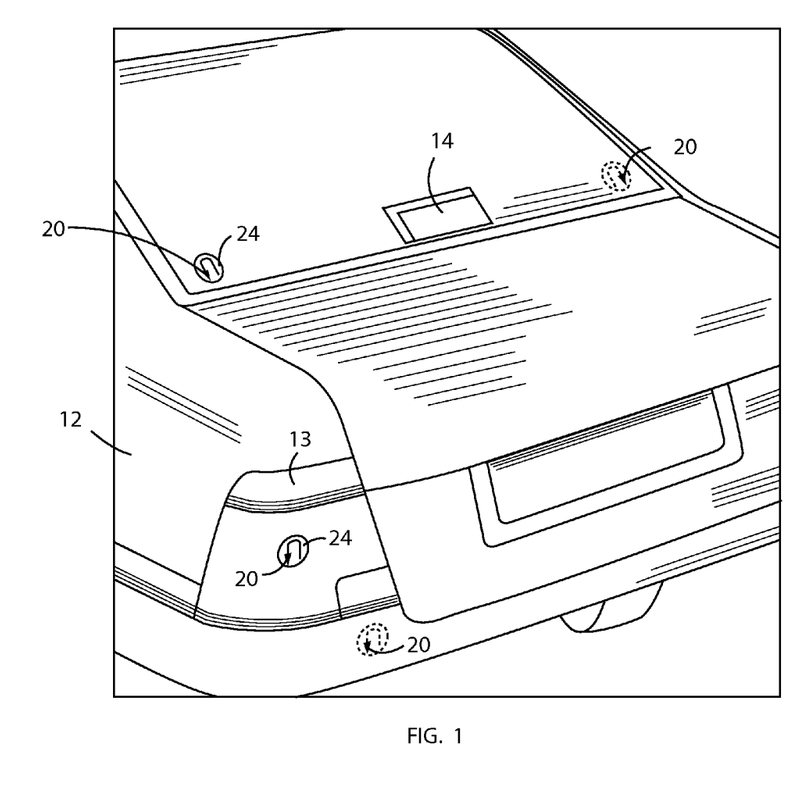
FIG. 1 is a rear perspective view of a vehicle equipped with a plurality of U-turn signals, in accordance with one embodiment of the present invention.
Figure 2:
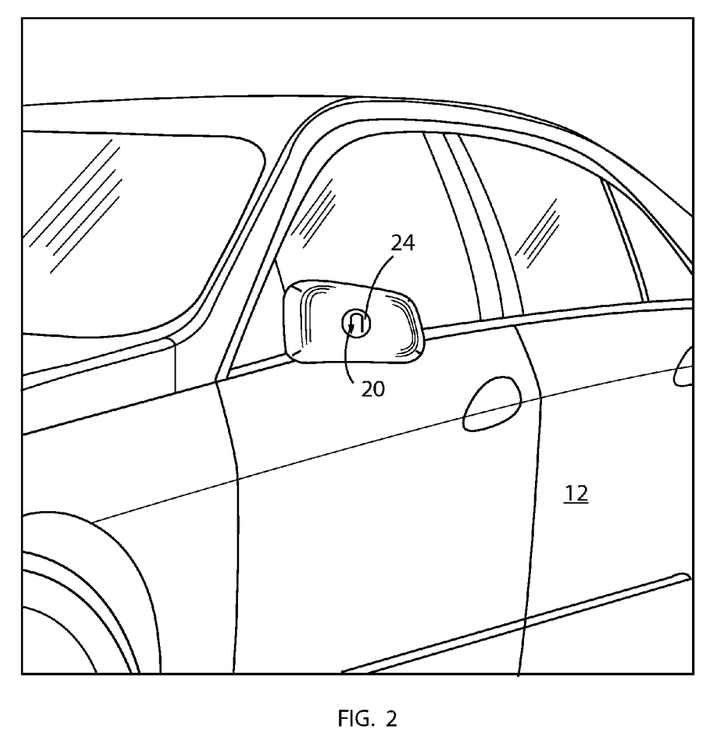
FIG. 2 is a side perspective view showing a U-turn signal disposed at a side view mirror of the vehicle.
Figure 3:
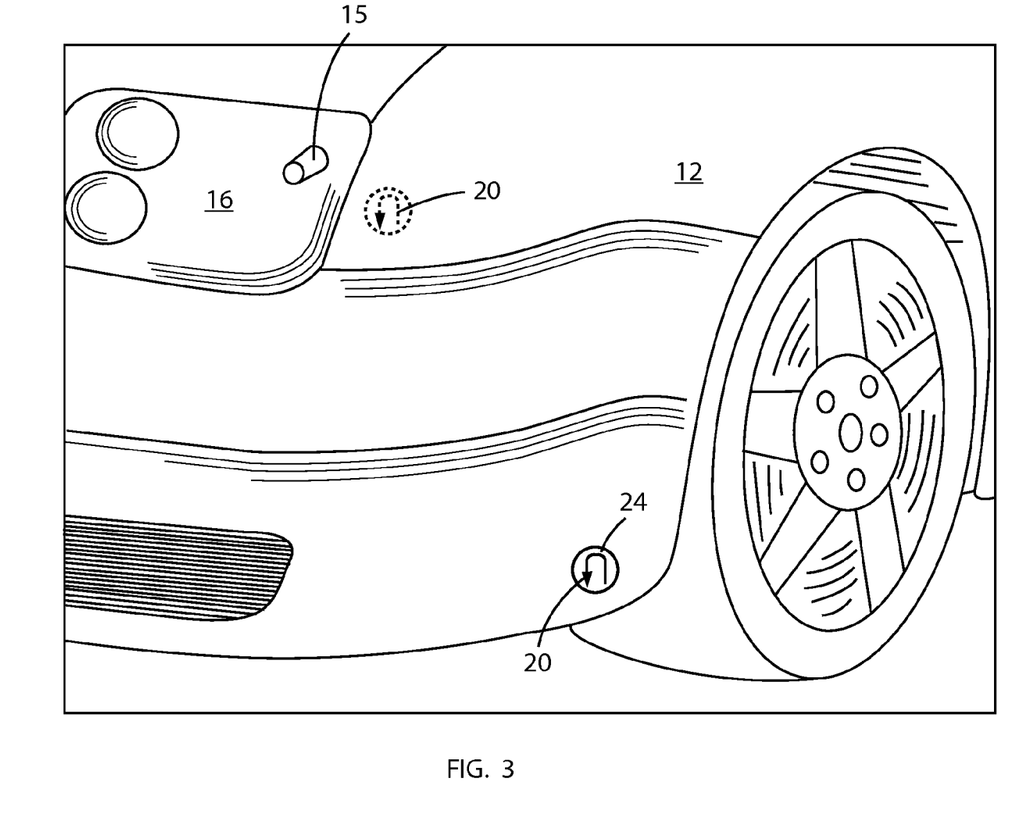
FIG. 3 is a front perspective view showing U-turn signals disposed near the head lights and front bumper of the vehicle.

In a non-limiting exemplary embodiment, activator 22 may be rotated to illuminate the U-turn signal lights 20. Such an activator 22 may be positioned directly between the turn signal 13 and brake lights 14, located on either side of the back of the vehicle 12, as well as next to the turn signals 15 and below the headlights 16, on the front of the vehicle 12.

Figure 5:
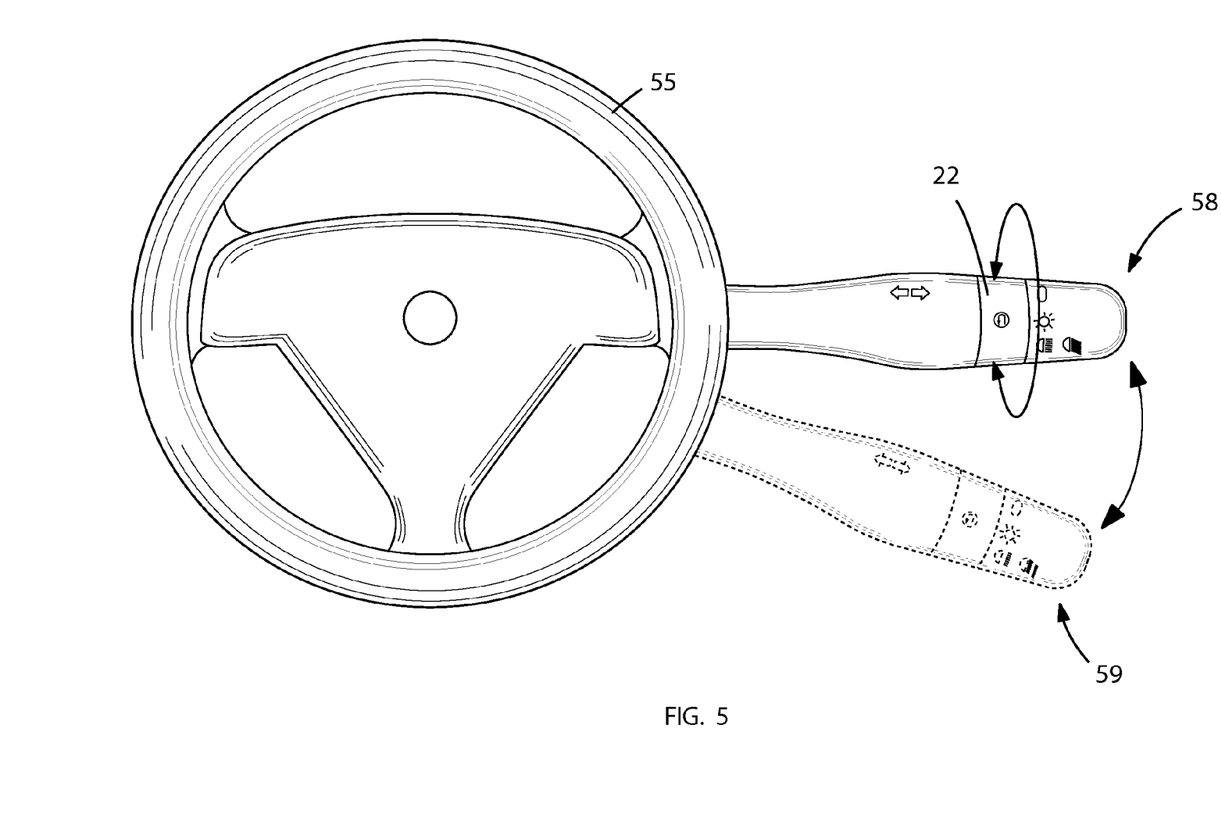
FIGS. 5-6 are front elevation views showing an exemplary activator pivoted between first and second positions.
Figure 6:
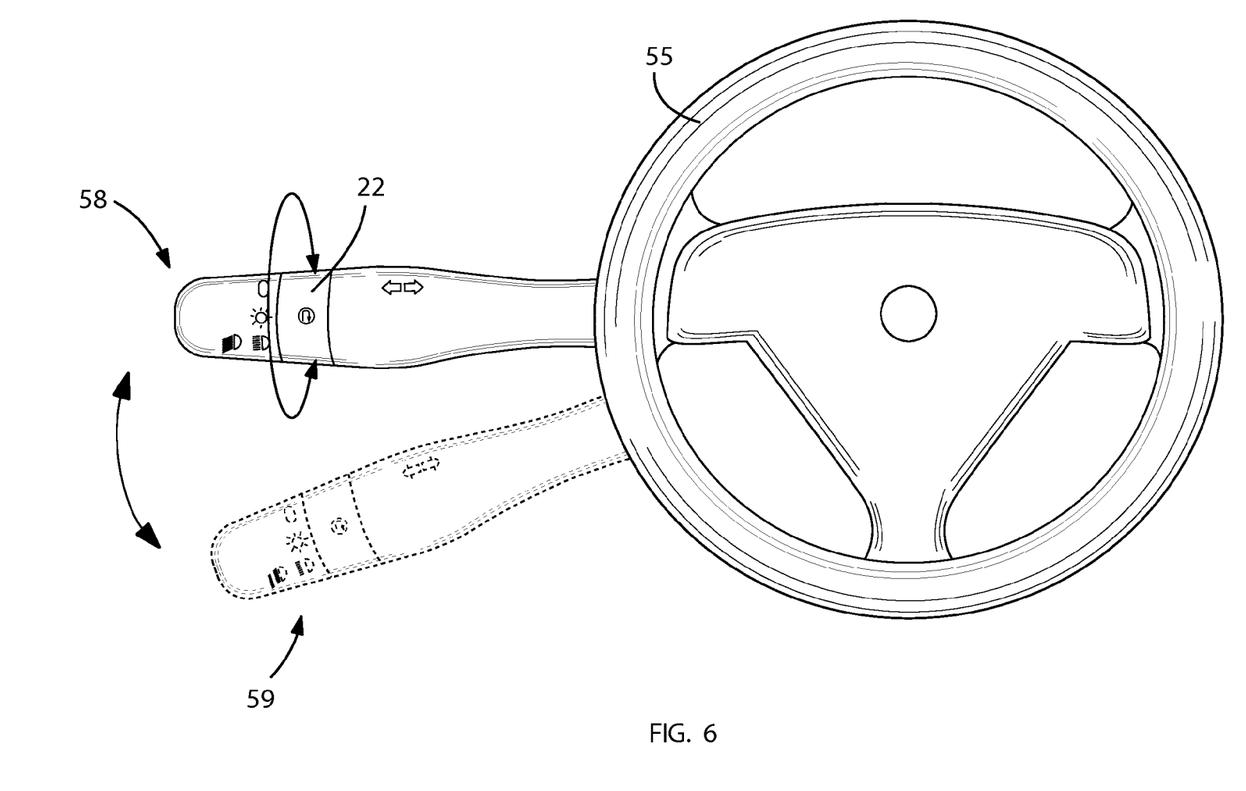
Figure 7:
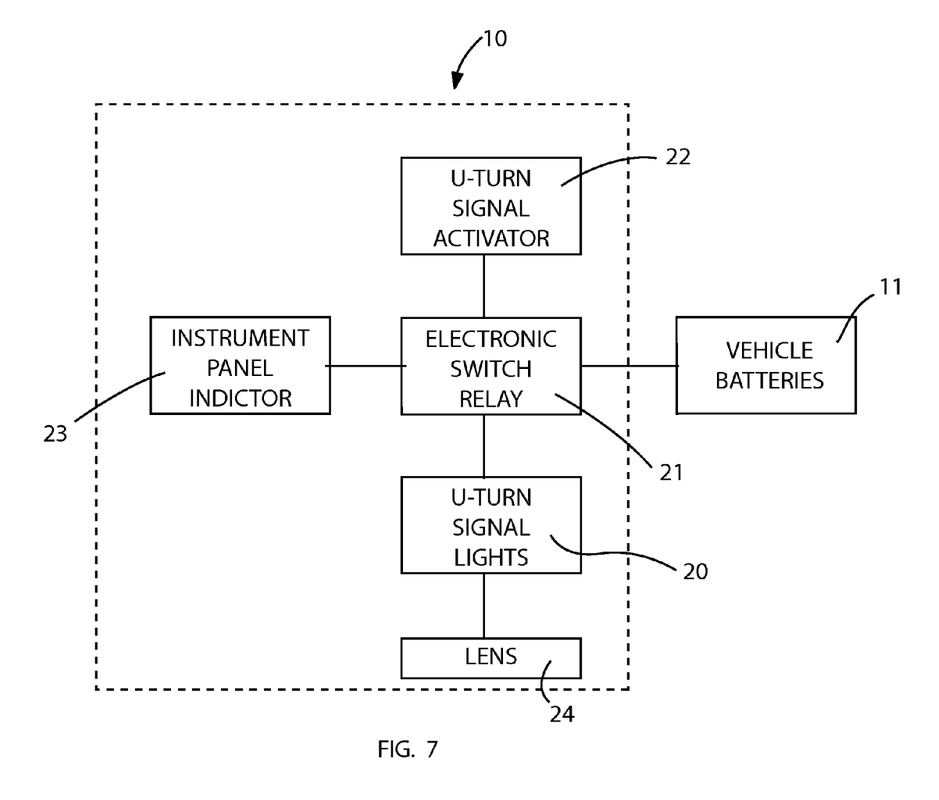
FIG. 7 is a high-level schematic block diagram showing the interrelationship between the major electronic components of the present invention.

In another non-limiting exemplary embodiment, activator 22 may be pivoted up and down from a neutral position.

The lens 24 of the signal lights 20 may include the universal symbol for a U-turn; for example an inverted "U" culminating in an arrow. When activated, the lens 24 may display the symbol in a flashing vibrant red or yellow hue, amid a contrasting color field. The system 10 may be incorporated into new vehicles as Original Equipment (OE) or installed into a user's existing vehicle 11.

There are several advantages and benefits associated with the vehicle U-turn indicator system 10. Initially, the system 10 may be an effective mechanism for providing other motorists with ample warning of an intended vehicle U-turn. The system 10 may help prevent many rear end collisions caused by motorists following too closely. By viewing the eye-catching U-turn signal lights 20, other motorists may be given the opportunity to reduce their speed and create an appropriate amount of distance between their vehicle and the vehicle making the U-turn in front of them. The inclusion of the U-turn signal lights 20 on the front turn blinkers, as well as those located on the rear of the vehicle 11 may provide an added safety precaution because it may warn vehicles coming in both directions of their intentions. Ultimately, by increasing safety and reducing property damage, the system 10 may be an effective measure in helping lower a driver's insurance rates.

To make a standard turn, the user may simply push the signal lever once, up or down, as normal to indicate the direction. The user attempting to make a U-turn may pull the U-turn signal activator 22 down two-times or, alternatively, upwards two-times to activate the U-turn signals. This action may activate the electronic switch relay 21, allowing current to flow through the electronics switch relay 21, thus causing the U-turn signal lights 20 to flash. Once the turn is completed, the U-turn signal lights 20 may be stopped manually by switching the U-turn signal activator 22 to its original (neutral) position.

In an alternative embodiment, the U-turn signal activator 22 may be integrated into the turn signal lever located on the steering wheel 55 of the vehicle 11. In this way, the U-turn signal lights 20 may be stopped through use of a conventional automatic self canceling mechanism on the steering wheel shaft, in a manner well known in the art.

Referring to FIGS. 1-8, a vehicle U-turn signal indicating system 10 for identifying abrupt vehicle maneuvers preferably includes a plurality of U-turn signal lights 20 adapted to be positioned on an exterior surface of a vehicle 12, a steering wheel 55 having a U-turn signal activator 22 pivotally coupled thereto, and an electronic switch relay 21 electrically coupled to the U-turn signal activator 22 and the U-turn signal lights 20. Advantageously, the U-turn signal activator 22 is selectively displaced between first and second positions 58, 59 in such a manner that the electronic switch relay 21 selectively toggles the U-turn signal lights 20 between illuminated and non-illuminated modes respectively. Such a structural configuration provides the unexpected and unpredictable advantage of enabling a user to quickly activate a conventional turn signal light or the U-turn signal light 20 of the present disclosure.

Figure 8:
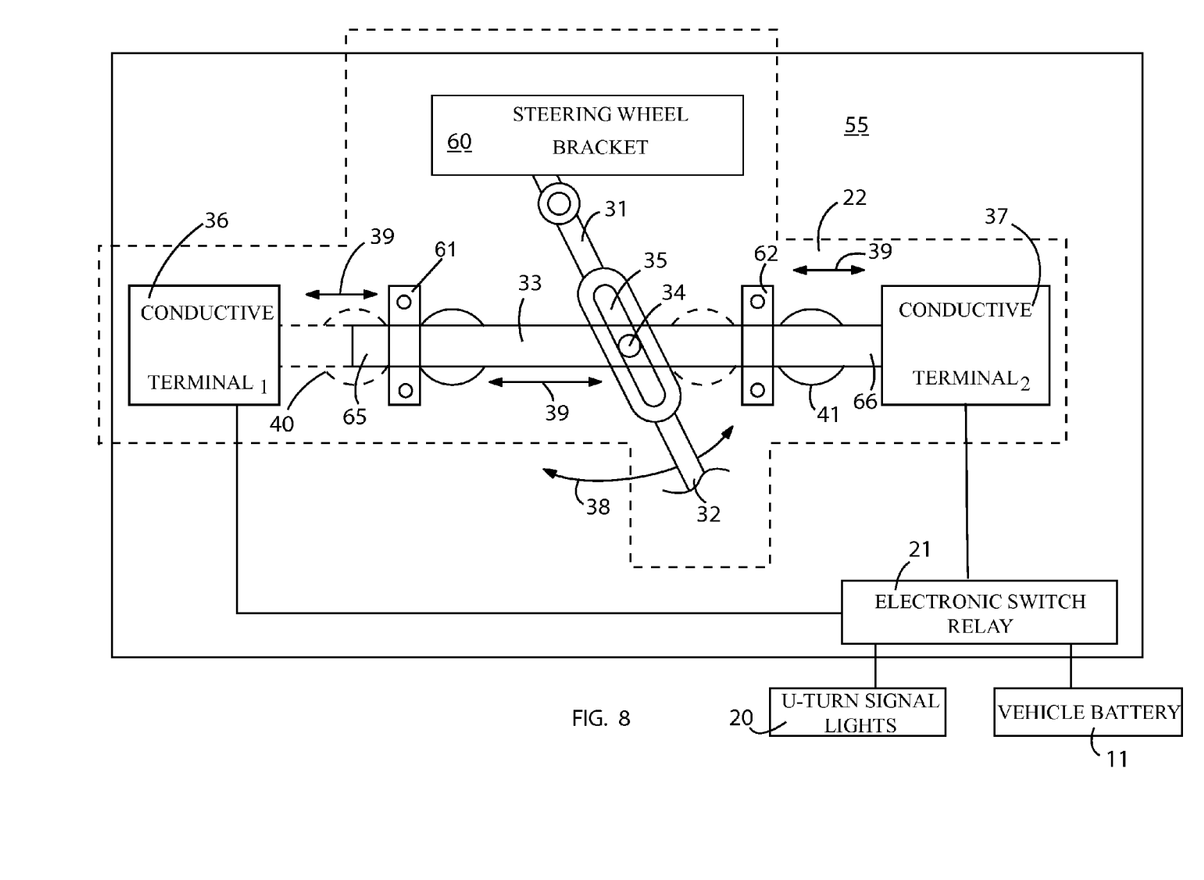
FIG. 8 is a high-level schematic diagram illustrating the interrelationship between the major components of the U-turn signal activator.

In a non-limiting exemplary embodiment, the U-turn signal activator 22 may include a plurality of brackets 60-62 located within the steering wheel 55, and a lever 30 having a first end 31 pivotally coupled to a first one of the brackets 60 and further having a second end 32 passing through second and third ones of the brackets 61, 62. Such a lever 30 may have a slot 35 intermediately located between the first and second ends 31, 32 thereof. A linear arm 33 may have a finger 34 slidably coupled to the slot 35. A plurality of conductive terminals 36, 37 may be interchangeably engaged to axially opposed ends 65, 66 of the linear arm 33. Such conductive terminals 36, 37 may be electrically coupled to the electronic switch relay 21 such that one of the U-turn signal lights 20 is illuminated when a corresponding one of the conductive terminals 36, 37 engages the linear arm 33. Such a structural configuration provides the unexpected and unpredictable advantage of ensuring the activator 22 oscillates between left and right U-turn signal positions 58, 59 corresponding to left and right U-turns.

In a non-limiting exemplary embodiment, the finger 34 linearly reciprocates 66 within the slot 35 as the lever 30 is pivoted along the arcuate path 38 and thereby causes the linear arm 33 to linearly reciprocate along a bi-directional linear path 39 defined through the second and third brackets 61-62. Such a structural configuration provides the unexpected and unpredictable advantage of ensuring conductive terminals 61, 62 remain aligned with opposed ends 65, 66 of linear arm 33.

In a non-limiting exemplary embodiment, the linear arm 33 may be provided with first and second groups of protrusions 40, 41 extending outwardly from the opposed ends 65, 66 thereof, respectively. Such protrusion groups 40, 41 frictionally pass through the second and third brackets 61, 62 as the linear arm 33 reciprocates along the bi-directional linear path 39.

Figure 4:
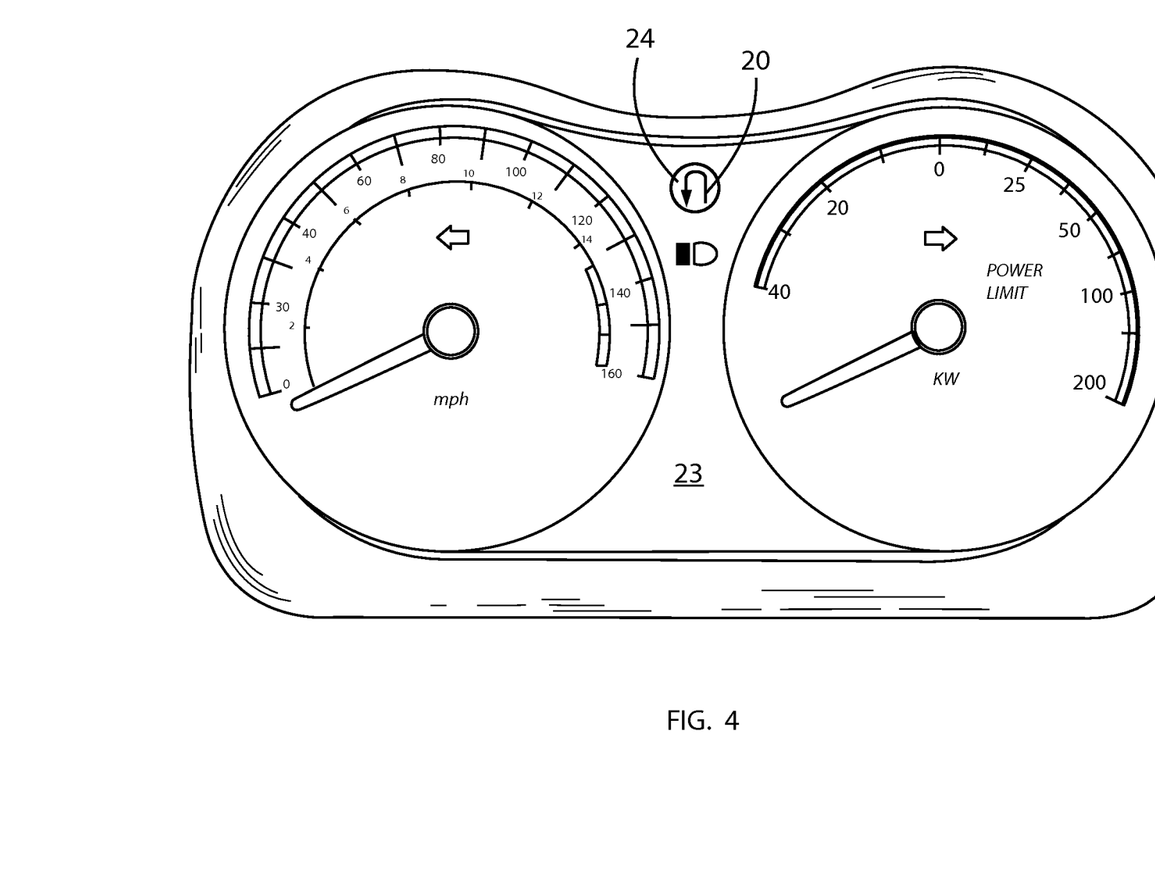
FIG. 4 is a front elevation view of an exemplary instrument panel having a U-turn signal depicted thereon.

In a non-limiting exemplary embodiment, an instrument panel indicator 23 may bear at least one of the U-turn signal lights 20.

In a non-limiting exemplary embodiment, each of the U-turn signal lights 20 may include a lens 24 coupled thereto. Notably, such a lens 24 preferably has surface indicia illustrating an image of a U-turn.

The present disclosure may further include a method of utilizing a vehicle U-turn signal indicating system 10 for identifying abrupt vehicle maneuvers. Such a method preferably includes the steps of: providing a plurality of U-turn signal lights 20 adapted to be positioned on an exterior surface of a vehicle 12; providing a steering wheel 55 having a U-turn signal activator 22 pivotally coupled thereto; providing and electrically coupling an electronic switch relay 21 to the U-turn signal activator 22 and the U-turn signal lights 20 respectively; and selectively displacing the U-turn signal activator 22 between first and second positions 58, 59 in such a manner that the electronic switch relay 21 selectively toggles the U-turn signal lights 20 between illuminated and non-illuminated modes, respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A vehicle U-turn signal indicating system for identifying abrupt vehicle maneuvers, said vehicle U-turn signal indicating system comprising:
   a plurality of U-turn signal lights adapted to be positioned on an exterior surface of a vehicle;
   a steering wheel having a U-turn signal activator communicatively coupled thereto; and
   an electronic switch relay communicatively coupled to said U-turn signal activator and said U-turn signal lights;
   wherein said U-turn signal activator is selectively displaced between first and second positions in such a manner that said electronic switch relay selectively toggles said U-turn signal lights between illuminated and non-illuminated modes respectively;
   wherein said U-turn signal activator comprises
   a plurality of brackets located within said steering wheel;
   a lever having a first end pivotally coupled to a first one of said brackets and further having a second end passing through second and third ones of said brackets, said lever further having a slot intermediately located between said first and second ends thereof;
   a linear arm having a finger slidably coupled to said slot; and
   a plurality of conductive terminals interchangeably engaged to axially opposed ends of said linear arm, said conductive terminals being electrically coupled to said electronic switch relay such that one of said U-turn signal lights is illuminated when a corresponding one of said conductive terminals engages said linear arm.

2. The vehicle U-turn signal indicating system of claim 1, wherein said finger linearly reciprocates within said slot as said lever is pivoted along said arcuate path and thereby causes said linear arm to linearly reciprocate along a bi-directional linear path defined through said second and third brackets.

3. The vehicle U-turn signal indicating system of claim 2, wherein said linear arm is provided with first and second groups of protrusions extending outwardly from said opposed ends thereof respectively, said protrusions frictionally passing through said second and third brackets as said linear arm reciprocates along said bi-directional linear path.

4. The vehicle U-turn signal indicating system of claim 1, further comprising: an instrument panel indicator bearing at least one of said U-turn signal lights.

5. The vehicle U-turn signal indicating system of claim 1, wherein each of said U-turn signal lights includes a lens coupled thereto, said lens having surface indicia illustrating an image of a U-turn.

6. A vehicle U-turn signal indicating system for identifying abrupt vehicle maneuvers, said vehicle U-turn signal indicating system comprising:
   a plurality of U-turn signal lights adapted to be positioned on an exterior surface of a vehicle;
   a steering wheel having a U-turn signal activator pivotally coupled thereto; and
   an electronic switch relay electrically coupled to said U-turn signal activator and said U-turn signal lights;
   wherein said U-turn signal activator is selectively displaced between first and second positions in such a manner that said electronic switch relay selectively toggles said U-turn signal lights between illuminated and non-illuminated modes respectively;
   wherein said U-turn signal activator comprises
   a plurality of brackets located within said steering wheel;
   a lever having a first end pivotally coupled to a first one of said brackets and further having a second end passing through second and third ones of said brackets, said lever further having a slot intermediately located between said first and second ends thereof;
   a linear arm having a finger slidably coupled to said slot; and
   a plurality of conductive terminals interchangeably engaged to axially opposed ends of said linear arm, said conductive terminals being electrically coupled to said electronic switch relay such that one of said U-turn signal lights is illuminated when a corresponding one of said conductive terminals engages said linear arm.

7. The vehicle U-turn signal indicating system of claim 6, wherein said finger linearly reciprocates within said slot as said lever is pivoted along said arcuate path and thereby causes said linear arm to linearly reciprocate along a bi-directional linear path defined through said second and third brackets.

8. The vehicle U-turn signal indicating system of claim 7, wherein said linear arm is provided with first and second groups of protrusions extending outwardly from said opposed ends thereof respectively, said protrusions frictionally passing through said second and third brackets as said linear arm reciprocates along said bi-directional linear path.

9. The vehicle U-turn signal indicating system of claim 6, further comprising: an instrument panel indicator bearing at least one of said U-turn signal lights.

10. The vehicle U-turn signal indicating system of claim 6, wherein each of said U-turn signal lights includes a lens coupled thereto, said lens having surface indicia illustrating an image of a U-turn.

* * * * *